US011979103B2

United States Patent
Arafat et al.

(10) Patent No.: US 11,979,103 B2
(45) Date of Patent: May 7, 2024

(54) POLE SWITCHING IN MULTI-PHASE MACHINES

(71) Applicant: Cummins Inc., Columbus, IN (US)

(72) Inventors: Akm Arafat, Blaine, MN (US); Bradford K. O. Palmer, Ham Lake, MN (US)

(73) Assignee: CUMMINS INC., Columbus, IN (US)

(*) Notice: Subject to any disclaimer, the term of this patent is extended or adjusted under 35 U.S.C. 154(b) by 0 days.

(21) Appl. No.: 17/915,450

(22) PCT Filed: Feb. 8, 2021

(86) PCT No.: PCT/US2021/017039
§ 371 (c)(1),
(2) Date: Sep. 28, 2022

(87) PCT Pub. No.: WO2021/201983
PCT Pub. Date: Oct. 7, 2021

(65) Prior Publication Data
US 2023/0179134 A1    Jun. 8, 2023

Related U.S. Application Data

(60) Provisional application No. 63/004,603, filed on Apr. 3, 2020.

(51) Int. Cl.
*H02P 1/32* (2006.01)
*H02P 25/20* (2006.01)

(52) U.S. Cl.
CPC .................................. *H02P 25/20* (2013.01)

(58) Field of Classification Search
CPC .......... H02P 25/20; H02P 25/22; H02P 25/18; H02P 1/48
See application file for complete search history.

(56) References Cited

U.S. PATENT DOCUMENTS 6,008,616 A    12/1999 Nagayama
6,150,791 A    11/2000 Fulton
(Continued)

FOREIGN PATENT DOCUMENTS

WO    2012030460 A2    3/2012
WO    2018213874 A1    11/2018

OTHER PUBLICATIONS

International Search Report and Written Opinion for International patent application No. PCT/US2021/017039, filed Feb. 8, 2021, mailed Apr. 23, 2021.
(Continued)

*Primary Examiner* — Karen Masih
(74) *Attorney, Agent, or Firm* — Faegre Drinker Biddle & Reath LLP (57) ABSTRACT

A method and system of performing a pole switching operation in a multi-phase machine include operating the multi-phase machine in a first configuration with a first number of poles, where the first number of poles is based on a first number of phases in the first configuration and a number of stator slots allocated for each winding in the multi-phase machine. The method and system also include receiving a signal indicating the pole switching operation in the multi-phase machine. In response to receiving the signal, the method and system include operating the multi-phase machine in a second configuration with a second number of poles, where the second number of poles is based on a second number of phases in the second configuration and the number of stator slots allocated for each winding in the multi-phase machine.

16 Claims, 7 Drawing Sheets

(56) References Cited

U.S. PATENT DOCUMENTS

| | | |
|---|---|---|
| 6,788,021 B2 | 9/2004 | Sozer |
| 8,104,556 B2 | 1/2012 | Kojima |
| 8,618,760 B2 | 12/2013 | Bosch |
| 9,231,513 B2 | 1/2016 | Baba |
| 2008/0246426 A1 | 10/2008 | Aoki |
| 2009/0128076 A1 | 5/2009 | Taniguchi |
| 2010/0019714 A1 | 1/2010 | Fuchs |
| 2014/0009093 A1 | 1/2014 | Suzuki |
| 2016/0056747 A1* | 2/2016 | Mao ........................ H02K 17/14 318/777 |
| 2017/0310263 A1 | 10/2017 | Namuduri et al. |
| 2017/0366129 A1 | 12/2017 | Hidaka |

OTHER PUBLICATIONS

International Preliminary Report on Patentability for International patent application No. PCT/US2021/017039, 2022, filed Feb. 8, 2021, mailed Mar. 30, 2022.

\* cited by examiner

POLE SWITCHING IN MULTI-PHASE MACHINES

CROSS-REFERENCE TO RELATED APPLICATIONS

The present application claims the benefit of International Patent Application No. PCT/US2021/017039, filed Feb. 8, 2021, which claims priority from U.S. Provisional Patent Application Ser. No. 63/004,603, filed on Apr. 3, 2020, the disclosures of which are hereby incorporation by reference in their entirety.

FIELD OF THE DISCLOSURE

The present disclosure generally relates to multi-phase electric machines, and more particularly to techniques for performing pole switching operations in a multi-phase electric machine.

BACKGROUND OF THE DISCLOSURE

Multi-phase electric machines are utilized in various applications including electric vehicles. For example, a drive system of an electric vehicle typically includes an alternating current (AC) electric motor driven by a direct current (DC) power source (e.g., a main battery). The AC electric motor is coupled to the DC power source via an inverter which performs switching functions to convert the DC power to AC power. During driving, different torques/speeds can be achieved in the electric vehicle by switching the number of poles in the AC electric motor. Conventional pole switching methods employ winding changeover mechanisms which often result in increased system cost and implementation complexity. Accordingly, there remains a need to develop better techniques for performing pole switching operations in multi-phase electric machines.

SUMMARY

According to some embodiments, the present disclosure provides a method by a controller to operate a multi-phase machine. The method includes operating the multi-phase machine in a first configuration with a first number of poles, where the first number of poles is based on a first number of phases in the first configuration and a number of stator slots allocated for each winding in the multi-phase machine. The method also includes receiving a signal indicating a pole switching operation in the multi-phase machine. In response to receiving the signal, the method includes operating the multi-phase machine in a second configuration with a second number of poles, where the second number of poles is based on a second number of phases in the second configuration and the number of stator slots allocated for each winding in the multi-phase machine.

According to certain embodiments, the present disclosure provides a controller that includes a processor and a memory. The memory includes instructions that, when executed by the processor, cause the controller operate a multi-phase machine in a first configuration with a first number of poles, where the first number of poles is based on a first number of phases in the first configuration and a number of stator slots allocated for each winding in the multi-phase machine. The processor also causes the controller to receive a signal indicating a pole switching operation in the multi-phase machine. In response to receiving the signal, the processor causes the controller to operate the multi-phase machine in a second configuration with a second number of poles, where the second number of poles is based on a second number of phases in the second configuration and the number of stator slots allocated for each winding in the multi-phase machine.

According to some embodiments, the present disclosure provides a system that includes a multi-phase machine, an inverter having a plurality of inverter legs, and a controller coupled to the inverter and the multi-phase machine. The controller is configured to operate the multi-phase machine in a first configuration with a first number of poles, where the first number of poles being based on a first number of phases in the first configuration and a number of stator slots allocated for each winding in the multi-phase machine. The controller is also configured to receive a signal indicating a pole switching operation in the multi-phase machine. In response to receiving the signal, the controller is configured to operate the multi-phase machine in a second configuration with a second number of poles, where the second number of poles being based on a second number of phases in the second configuration and the number of stator slots allocated for each winding in the multi-phase machine.

In certain embodiments, the controller determines a number of windings per phase in the first configuration based on a total number of windings in the multi-phase machine and the first number of phases in the first configuration. In some embodiments, the controller determines the first number of poles based on the number of windings per phase in the first configuration and the number of stator slots allocated for each winding in the multi-phase machine. In certain embodiments, the controller determines a number of windings per phase in the second configuration based on the total number of windings in the multi-phase machine and the second number of phases in the second configuration. In some embodiments, the controller determines the second number of poles based on the number of windings per phase in the second configuration and the number of stator slots allocated for each winding in the multi-phase machine.

In some examples, each phase of the first number of phases in the first configuration is separated by a first phase angle, and each phase of the second number of phases in the second configuration is separated by a second phase angle. The first phase angle is different from the second phase angle. In certain examples, the first configuration is a three-phase machine configuration, and the second configuration is a six-phase machine configuration. In some examples, the multi-phase machine is disposed in a vehicle and the signal indicating the pole switching operation is associated with a command to change a current torque and speed of the vehicle to a desired torque and speed. In certain examples, the pole switching operation represents an electronic gear shifting operation in the vehicle. In some examples, the first number of poles in the three-phase machine configuration is equal to twelve and the second number of poles in the six-phase machine configuration is equal to six.

DETAILED DESCRIPTION

For the purposes of promoting an understanding of the principles of the present disclosure, reference is now made to the embodiments illustrated in the drawings, which are described below. The embodiments disclosed herein are not intended to be exhaustive or to limit the disclosure to the precise form disclosed in the following detailed description. Rather, these embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

One of ordinary skill in the art will realize that the embodiments provided can be implemented in hardware, software, firmware, and/or a combination thereof. Programming code according to the embodiments can be implemented in any viable programming language such as C, C++, HTML, XTML, JAVA or any other viable high-level programming language, or a combination of a high-level programming language and a lower level programming language.

Figure 1:
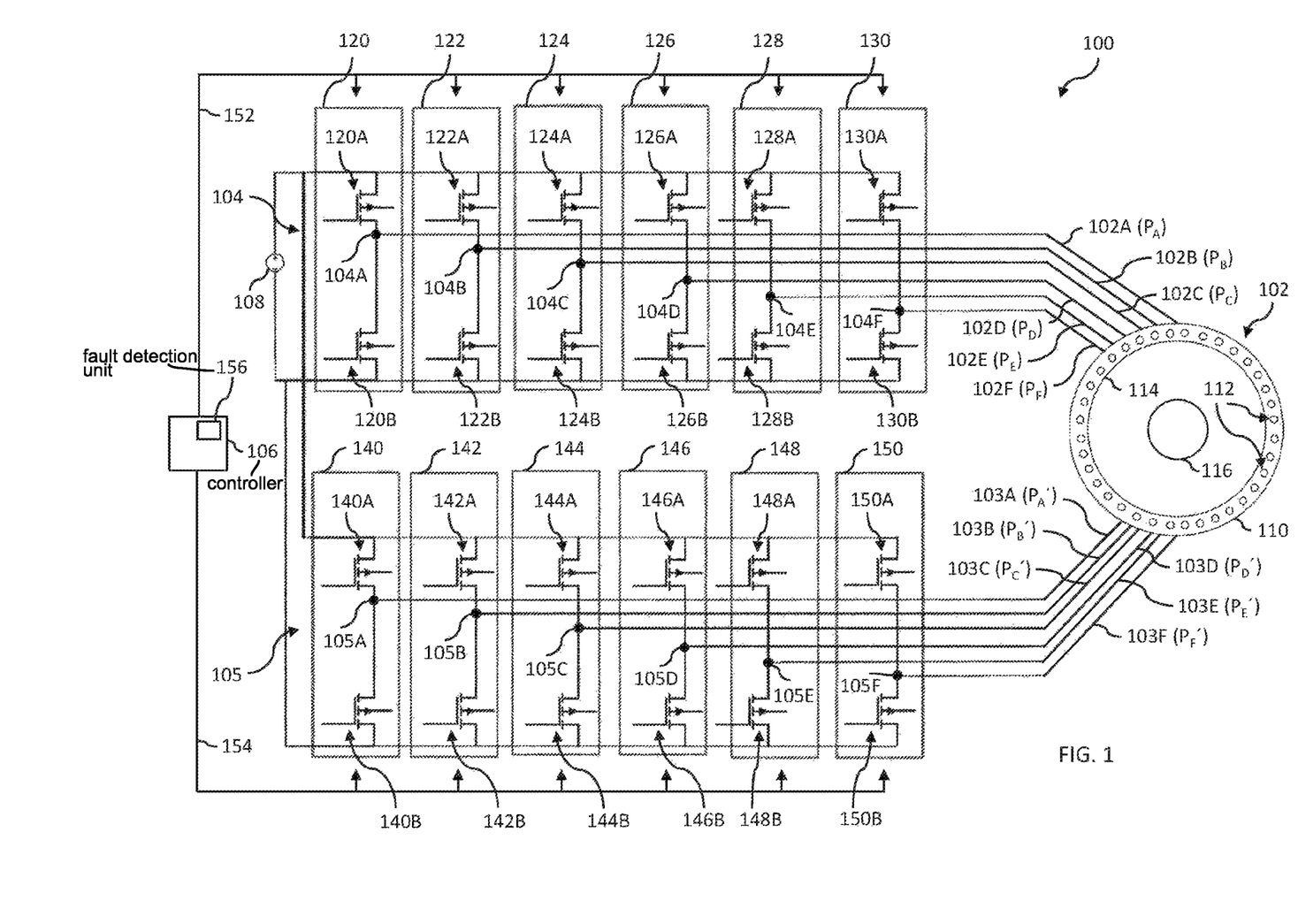
FIG. 1 is a block diagram illustrating a multi-phase system.

Referring now to FIG. 1, a block diagram of a multi-phase system 100 is shown including a multi-phase AC machine 102, inverters 104, 105, and a controller 106. Controller 106 operates multi-phase AC machine 102 via inverters 104, 105 such that multi-phase AC machine 102 can use DC power inputs provided to inverters 104, 105 by a DC power source 108. As used herein, the term "AC machine" refers to an AC powered device that converts electrical energy to mechanical energy or vice versa. For example, multi-phase AC machine 102 can be an induction machine, a permanent magnet type synchronous machine, a field winding type synchronous machine, etc. In some embodiments, multi-phase AC machine 102 is a motor used to provide torque in an electric vehicle. However, it should be appreciated that the disclosed embodiments can relate to other types of multi-phase electric machines in the context of other applications.

As shown in FIG. 1, multi-phase AC machine 102 has multiple windings including windings 102A-102F and windings 103A-103F for a total of twelve winding sets. Windings 102A-102F are connected to terminals 104A-104F, respectively of inverter 104. Windings 103A-103F are connected to terminals 105A-105F, respectively of inverter 105. Each winding 102A-102F is associated with a respective phase $P_A$-$P_F$, while each winding 103A-103F is associated with a respective phase $P_A'$-$P_F'$. As an example, phases $P_A$-$P_F$ and $P_A'$-$P_F'$ are complementary. It should be appreciated that other numbers of windings may be contemplated in other embodiments.

Windings 102A-102F and 103A-103F represent a stator 110 of multi-phase AC machine 102. Stator 110 includes a plurality of stator slots 112 arranged on stator 110 at regular intervals. Each winding 102A-102F, 103A-103F is allocated with three stator slots for a total of 36 slots in stator 110 as shown in FIG. 1. However, it should be appreciated that any number of stator slots may be contemplated in other embodiments. For example, each winding may be allocated with a different number of slots based at least in part upon machine design, machine optimization and/or other parameters.

On an inner side of stator 110, a rotor 114 is mounted to a shaft that passes through a shaft hole 116. As an example, rotor 114 is separated from stator 110 by an air gap. When utilized as a motor, stator 110 causes rotor 114 to rotate utilizing electrical energy thereby rotating the shaft to provide mechanical energy. On the other hand, when utilized as a generator, the shaft is rotated by an external mechanical force that causes rotor 114 to rotate thereby causing stator 110 to generate electrical energy. While not shown for ease of illustration, rotor 114 includes a plurality of rotor slots arranged on rotor 114 at regular intervals. It should be appreciated that any number of rotor slots may be contemplated for multi-phase AC machine 102.

Inverter 104 has a plurality of inverter legs including an inverter leg 120 connected to winding 102A via terminal 104A, an inverter leg 122 connected to winding 102B via terminal 104B, an inverter leg 124 connected to winding 102C via terminal 104C, an inverter leg 126 connected to winding 102D via terminal 104D, an inverter leg 128 connected to winding 102E via terminal 104E, and an inverter leg 130 connected to winding 102F via terminal 104F. Each inverter leg 120-130 includes at least one switch device. For example, inverter leg 120 includes a pair of switch devices 120A, 120B, inverter leg 122 includes a pair of switch devices 122A, 122B, inverter leg 124 includes a pair of switch devices 124A, 124B, inverter leg 126 includes a pair of switch devices 126A, 126B, inverter leg 128 includes a pair of switch devices 128A, 128B, and inverter leg 130 includes a pair of switch devices 130A, 130B. As an example, switch devices 120A, 120B, 122A, 122B, 124A, 124B, 126A, 126B, 128A, 128B, 130A, 130B include any type of solid-state switch devices such as insulated-gate bipolar transistors (IGBTs) or metal-oxide-semiconductor field-effect transistors (MOSFETs). In various embodiments, switch devices 120A, 120B, 122A, 122B, 124A, 124B, 126A, 126B, 128A, 128B, 130A, 130B are connected to one or more protection devices such as one or more freewheeling diodes. Switch devices 120A, 120B, 122A, 122B, 124A, 124B, 126A, 126B, 128A, 128B, 130A, 130B operate to switch DC voltages and provide energization to windings 102A-102F.

Inverter 105 has a plurality of inverter legs including an inverter leg 140 connected to winding 103A via terminal 105A, an inverter leg 142 connected to winding 103B via terminal 105B, an inverter leg 144 connected to winding 103C via terminal 105C, an inverter leg 146 connected to winding 103D via terminal 105D, an inverter leg 148 connected to winding 103E via terminal 105E, and an inverter leg 150 connected to winding 103F via terminal 105F. Each inverter leg 140-150 includes at least one switch device. For example, inverter leg 140 includes a pair of switch devices 140A, 140B, inverter leg 142 includes a pair of switch devices 142A, 142B, inverter leg 144 includes a pair of switch devices 144A, 144B, inverter leg 146 includes a pair of switch devices 146A, 146B, inverter leg 148 includes a pair of switch devices 148A, 148B, and inverter leg 150 includes a pair of switch devices 150A, 150B. As an example, switch devices 140A, 140B, 142A, 142B, 144A, 144B, 146A, 146B, 148A, 148B, 150A, 150B include any type of solid-state switch devices such as insulated-gate bipolar transistors (IGBTs) or metal-oxide-semiconductor field-effect transistors (MOSFETs). In various embodiments, switch devices 140A, 140B, 142A, 142B, 144A, 144B, 146A, 146B, 148A, 148B, 150A, 150B are connected to one or more protection devices such as one or more freewheeling diodes. Switch devices 140A, 140B, 142A, 142B, 144A, 144B, 146A, 146B, 148A, 148B, 150A, 150B operate to switch DC voltages and provide energization to windings 103A-103F.

According to some embodiments, inverter 104 is a pulse width modulated (PWM) inverter. For example, the duty ratios of switch devices 120A, 122A, 124A, 126A, 128A, and 130A are phase shifted by 120 degrees (electrical), with the duty ratios of switch devices 120B, 122B, 124B, 126B, 128B, 130B being complementary. According to certain embodiments, inverter 105 is a PWM inverter. For example, the duty ratios of switch devices 140A, 142A, 144A, 146A, 148A, and 150A are phase shifted by 120 degrees (electrical), with the duty ratios of switch devices 140B, 142B, 144B, 146B, 148B, 150B being complementary.

With twelve winding sets shown in FIG. 1, at least two six-leg inverters (inverters 104, 105) are needed for multi-phase AC machine 102, with each inverter configured to six windings. This avoids open-ended winding which would involve inverters with 24 legs. However, in some embodiments, other configurations and numbers of inverters may be contemplated for multi-phase AC machine 102. By having at least two inverters, the per phase current can be reduced which enhances the life of the overall inverter system. Additionally, electromagnetic ripples can be reduced due to having more dense excitations. Moreover, having at least two inverters adds redundancy to achieve high fault-tolerance. For example, in case that one or more switch devices and/or one or more windings fail, the system can still operate with minimal disturbances.

Controller 106 receives operating signals from multi-phase AC machine 102 and generates control signals 152, 154 to control the switching operations of inverters 104, 105, respectively to thereby control the outputs (e.g., currents) provided to windings 102A-102F and 103A-103F. In some examples, control signal 152 is the same as control signal 154. In certain examples, control signal 152 is different from control signal 154.

According to some embodiments, controller 106 includes a fault detection unit 156 that receives information associated with multi-phase AC machine 102 and/or inverters 104, 105 to determine faults. For example, fault detection unit 156 receives signals from sensors indicating various characteristics of the currents and/or voltages provided to windings 102A-102F and 103A-103F. As an example, fault detection unit 156 receives signals from sensors indicating the physical conditions of windings 102A-102F and 103A-103F. For example, fault detection unit 156 receives signals from sensors indicating the operational status of inverters 104, 105. Fault detection unit 156 processes the received information and determines whether a fault has occurred in multi-phase AC machine 102 and/or inverters 104, 105 (e.g., winding damage, insulation issues, moisture accumulation, broken wires, switch device malfunction, etc.). In certain embodiments, fault detection unit 156 provides a fault signal to an output unit (e.g., a display, an indicator light, a speaker, etc.) to indicate the determined fault to an observer (e.g., an operator of an electric vehicle). While FIG. 1 shows fault detection unit 156 as being a part of controller 106, in other embodiments, fault detection unit 156 may be a separate unit that is communicatively coupled to controller 106.

In certain embodiments, controller 106 comprises two controllers, each controlling a respective inverter. For example, a first controller controls the switching operations of inverter 104 through control signal 152, while a second controller controls the switching operations of inverter 105 through control signal 154. With this configuration, advanced switching frequency control techniques can be implemented for each controller to reduce current/torque ripples.

According to some embodiments, controller 106 includes a non-transitory memory having instructions that, in response to execution by a processor, cause the processor to perform the functions of controller 106 and/or fault detection unit 156 as described above. The processor, non-transitory memory and controller 106 are not particularly limited and can, for example, be physically separate.

In certain embodiments, controller 106 forms a portion of a processing subsystem including one or more computing devices having memory, processing, and communication hardware. For example, controller 106 can be a single device or a distributed device, and functions of controller 106 can be performed by hardware and/or as computer instructions on a non-transient computer readable storage medium, such as the non-transitory memory.

In some embodiments, controller 106 includes one or more interpreters, determiners, evaluators, regulators, and/or processors that functionally execute the operations of controller 106. Interpreters, determiners, evaluators, regulators, and processors can be implemented in hardware and/or as computer instructions on a non-transient computer readable storage medium, and can be distributed across various hardware or computer-based components.

Controller 106 performs pole switching operations by electrically commutating terminals 104A-104F connected to phases $P_A$-$P_F$ and terminals 105A-105F connected to phases $P_A'$-$P_F'$. According to various embodiments, controller 106 operates multi-phase AC machine 102 in a first configuration with a first number of poles, and in a second configuration with a second number of poles. For example, the first configuration is a single three-phase machine with twelve poles, while the second configuration is a single six-phase machine with six poles.

To configure multi-phase AC machine 102 as a single three-phase machine, controller 106 provides controls signals 152, 154 to inverters 104, 105 to generate twelve AC signals (signals 1-12) associated with phases $P_A$-$P_F$ and $P_A'$-$P_F'$ as shown below in Table 1.

TABLE 1

| Signal | Signal Excitation | Signal | Signal Excitation |
|---|---|---|---|
| 1 | $P_A = Me^{j\omega t}$ | 7 | $PA' = Me^{j\omega t}$ |
| 2 | $P_B = Me^{j(\omega t + \frac{1}{3}\pi)}$ | 8 | $P_B' = Me^{j(\omega t + \frac{1}{3}\pi)}$ |
| 3 | $P_C = Me^{j(\omega t + \frac{2}{3}\pi)}$ | 9 | $P_C' = Me^{j(\omega t + \frac{2}{3}\pi)}$ |

TABLE 1-continued

| Signal | Signal Excitation | Signal | Signal Excitation |
|---|---|---|---|
| 4 | $P_D = Me^{j(\omega t + \frac{3}{3}\pi)}$ | 10 | $P'_D = Me^{j(\omega t + \frac{3}{3}\pi)}$ |
| 5 | $P_E = Me^{j(\omega t + \frac{4}{3}\pi)}$ | 11 | $P'_E = Me^{j(\omega t + \frac{4}{3}\pi)}$ |
| 6 | $P_F = Me^{j(\omega t + \frac{5}{3}\pi)}$ | 12 | $P'_F = Me^{j(\omega t + \frac{5}{3}\pi)}$ |

M represents the magnitude of each signal (current or voltage) and $$\frac{*}{3}\pi$$

represents the phase shift

In Table 1, the first set of AC signals (signals 1-6) are shifted by 60 degrees (electrical). The second set of AC signals (signals 7-12) are also shifted by 60 degrees but are electrically in phase with the respective signals in the first set.

Figure 2A:
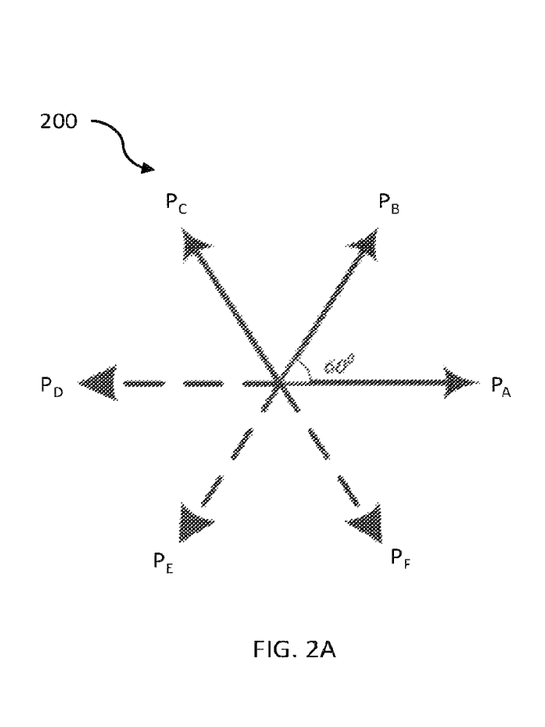
FIGS. 2A and 2B are conceptual diagrams illustrating the signals used in a first configuration of the multi-phase system of FIG. 1.
Figure 2B:
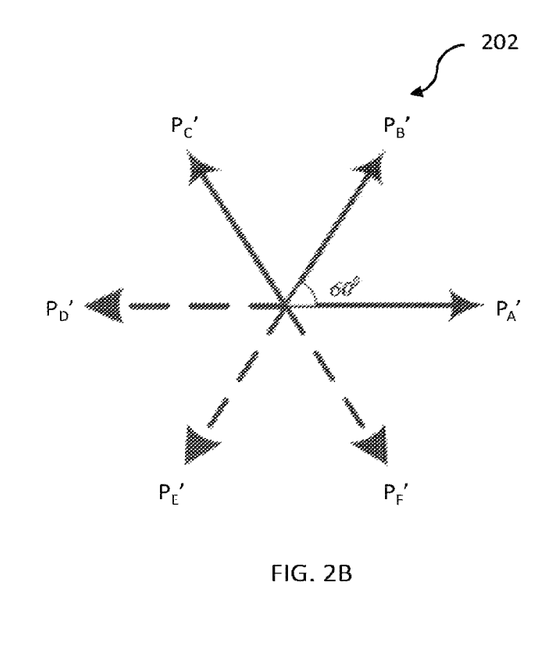

FIGS. 2A and 2B illustrate conceptual diagrams for the AC signals in Table 1. In particular, FIG. 2A shows a phasor diagram 200 for the first set of AC signals, where signals 1-3 ($P_A$-$P_C$) are positive and signals 4-6 ($P_D$-$P_F$) are negative. Similarly, FIG. 2B shows a phasor diagram 202 for the second set of AC signals, where signals 7-9 ($P_A'$-$P_C'$) are positive and signals 10-12 ($P_D'$-$P_F'$) are negative. Each AC signal in FIGS. 2A and 2B is phase shifted by 60 degrees.

Figure 3:
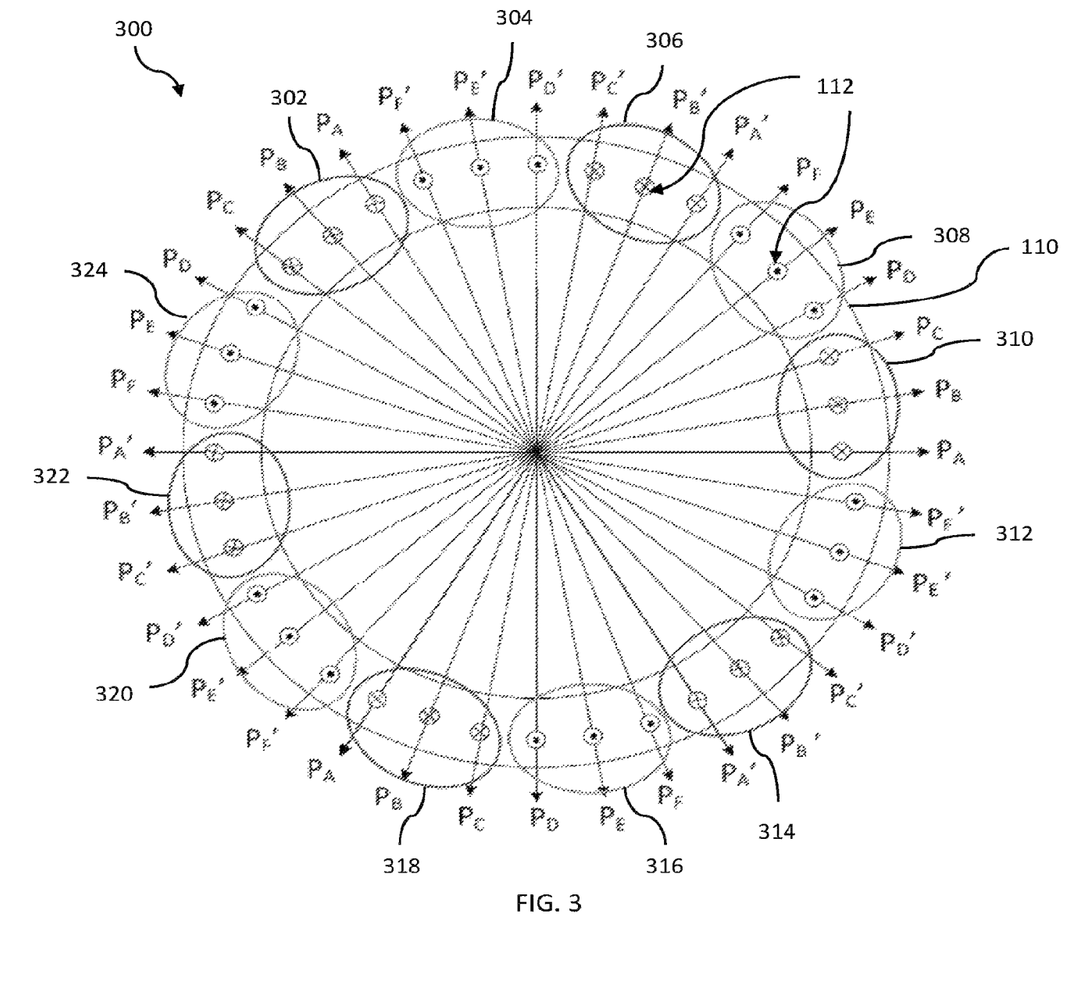
FIG. 3 is a conceptual diagram illustrating the generation of poles in the first configuration of the multi-phase system of FIG. 1.

FIG. 3 illustrates a conceptual diagram 300 for the generation of poles using the AC signals in Table 1. Twelve magnetic poles 302-324 are obtained from the 36 stator slots 112 of multi-phase AC machine 102. As shown, there are twelve stator slots per phase and three stator slots per magnetic pole. For example, magnetic poles 302, 310, 318 are generated using signals 1-3 ($P_A$-$P_C$), magnetic poles 306, 314, 322 are generated using signals 7-9 ($P_A'$-$P_C'$), magnetic poles 308, 316, 324 are generated using signals 4-6 ($P_D$-$P_F$), and magnetic poles 304, 312, 320 are generated using signals 10-12 ($P_D'$-$P_F'$). As an example, magnetic poles 302, 306, 310, 314, 318, 322 represent positive poles while magnetic poles 304, 308, 312, 316, 320, 324 represent negative poles.

To configure multi-phase AC machine 102 as a single six-phase machine, controller 106 provides control signals 152, 154 to inverters 104, 105 to generate twelve AC signals (signals 13-24) associated with phases $P_A$-$P_F$ and $P_A'$-$P_F'$ as shown below in Table 2.

TABLE 2

| Signal | Signal Excitation | Signal | Signal Excitation |
|---|---|---|---|
| 13 | $P_A = Me^{j\omega t}$ | 19 | $P_A' = -Me^{j\omega t}$ |
| 14 | $P_B = Me^{j(\omega t + \frac{1}{6}\pi)}$ | 20 | $P'_B = -Me^{j(\omega t + \frac{1}{6}\pi)}$ |
| 15 | $P_C = Me^{j(\omega t + \frac{2}{6}\pi)}$ | 21 | $P'_C = -Me^{j(\omega t + \frac{2}{6}\pi)}$ |
| 16 | $P_D = Me^{j(\omega t + \frac{3}{6}\pi)}$ | 22 | $P'_D = -Me^{j(\omega t + \frac{3}{6}\pi)}$ |

TABLE 2-continued

| Signal | Signal Excitation | Signal | Signal Excitation |
|---|---|---|---|
| 17 | $P_E = Me^{j(\omega t + \frac{4}{6}\pi)}$ | 23 | $P'_E = -Me^{j(\omega t + \frac{4}{6}\pi)}$ |
| 18 | $P_F = Me^{j(\omega t + \frac{5}{6}\pi)}$ | 24 | $P'_F = -Me^{j(\omega t + \frac{5}{6}\pi)}$ |

M represents the magnitude of each signal (current or voltage) and $$\frac{*}{6}\pi$$

represents the phase shift

In Table 2, the first set of AC signals (signals 13-18) are shifted by 30 degrees (electrical). The second set of AC signals (signals 19-24) are also shifted by 30 degrees but are electrically out of phase with the respective signals in the first set.

Figure 4:
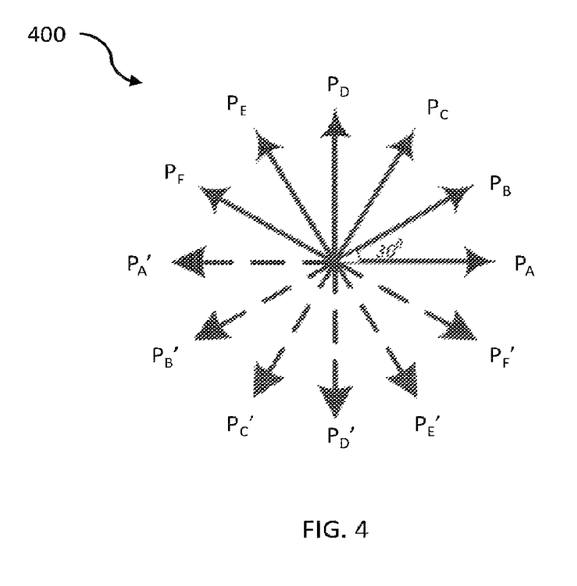
FIG. 4 is a conceptual diagram illustrating the signals used in a second configuration of the multi-phase system of FIG. 1.

FIG. 4 illustrates a conceptual diagram for the AC signals in Table 2. In particular, FIG. 4 shows a phasor diagram 400 for the first set of AC signals 13-18 ($P_A$-$P_F$) and the second set of AC signals 19-24 ($P_A'$-$P_F'$), where signals 13-18 are positive while signals 19-24 are negative. Each AC signal in FIG. 4 is phase shifted by 30 degrees.

Figure 5:
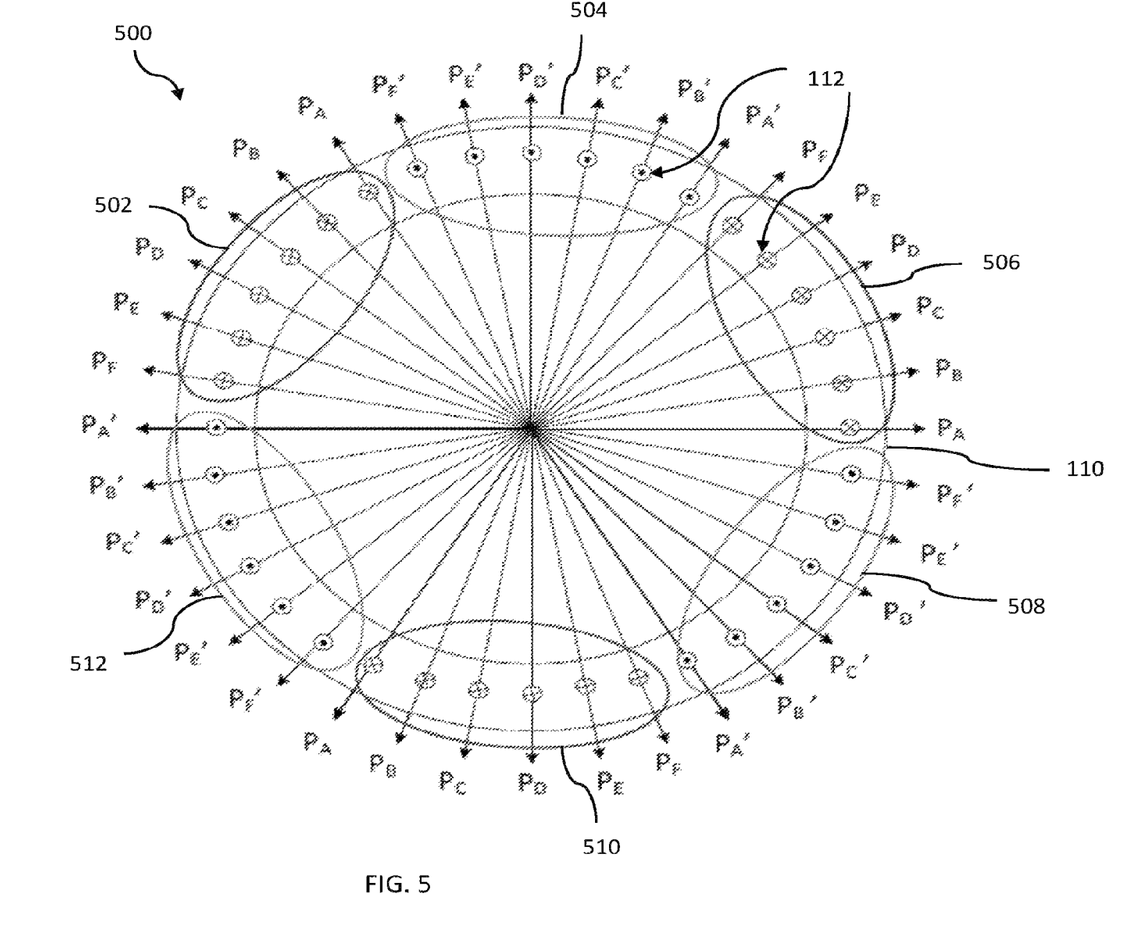
FIG. 5 is a conceptual diagram illustrating the generation of poles in the second configuration of the multi-phase system of FIG. 1.

FIG. 5 illustrates a conceptual diagram 500 for the generation of poles using the AC signals in Table 2. Six magnetic poles 502-512 are obtained from the 36 stator slots 112 of multi-phase AC machine 102. As shown, there are two stator slots per phase and six stator slots per magnetic pole. For example, magnetic poles 502, 506, 510 are generated using signals 13-18 ($P_A$-$P_F$), and magnetic poles 504, 508, 512 are generated using signals 19-24 ($P_A'$-$P_F'$). As an example, magnetic poles 502, 506, 510 represent positive poles while magnetic poles 504, 508, 512 represent negative poles.

Figure 6:
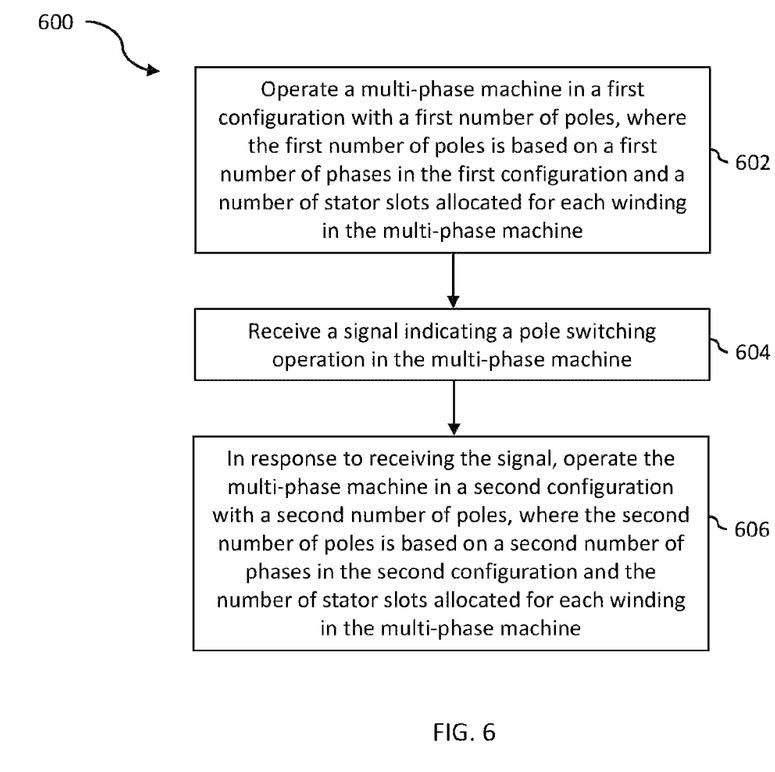
FIG. 6 is a flow chart illustrating a method for operating the multi-phase system of FIG. 1.

Referring now to FIG. 6, a method 600 for operating a multi-phase machine (e.g., 102) is shown. As an example, method 600 is performed by a controller (e.g., 106). At block 602, the controller operates the multi-phase machine in a first configuration with a first number of poles. The first number of poles is based on a first number of phases in the first configuration and a number of stator slots allocated for each winding in the multi-phase machine.

According to some embodiments, the first configuration is a three-phase machine configuration. As such, the first number of phases is equal to three. The controller determines a number of windings per phase for the three-phase machine configuration based on a total number of windings and the first number of phases. For example, if the total number windings is equal to twelve, then there are four windings per phase in the three-phase machine configuration. The controller determines the first number of poles based on the number of windings per phase in the three-phase machine configuration and the number of stator slots allocated for each winding. As an example, if the number of stator slots allocated for each winding is equal to three, then there are twelve poles in the three-phase machine configuration. Each phase of the first number of phases in the three-phase machine configuration is separated by a first phase angle (e.g., 60 degrees).

At the block 604, the controller receives a signal indicating a pole switching operation in the multi-phase machine. For example, the multi-phase machine is disposed in a vehicle (e.g., electric or hybrid vehicle) and the signal indicating the pole switching operation is associated with a command to change a current torque and speed of the vehicle to a desired torque and speed. As an example, the pole switching operation represents an electronic gear shifting operation in the vehicle. In various embodiments, the pole switching operation is performed to cover a wider speed range with a lower pole number operation.

At the block 606, in response to receiving the signal indicating the pole switching operation, the controller operates the multi-phase machine in a second configuration with a second number of poles. The second number of poles is based on a second number of phases in the second configuration and the number of stator slots allocated for each winding in the multi-phase machine.

According to certain embodiments, the second configuration is a six-phase machine configuration. As such, the second number of phases is equal to six. The controller determines a number of windings per phase for the six-phase machine configuration based on the total number of windings and the second number of phases. For example, if the total number windings is equal to twelve, then there are two windings per phase in the six-phase machine configuration. The controller determines the second number of poles based on the number of windings per phase in the six-phase machine configuration and the number of stator slots allocated for each winding. As an example, if the number of stator slots allocated for each winding is equal to three, then there are six poles in the six-phase machine configuration. Each phase of the second number of phases in the six-phase machine configuration is separated by a second phase angle (e.g., 30 degrees). In various embodiments, the second phase angle for the second configuration is different from the first phase angle for the first configuration.

Figure 7:
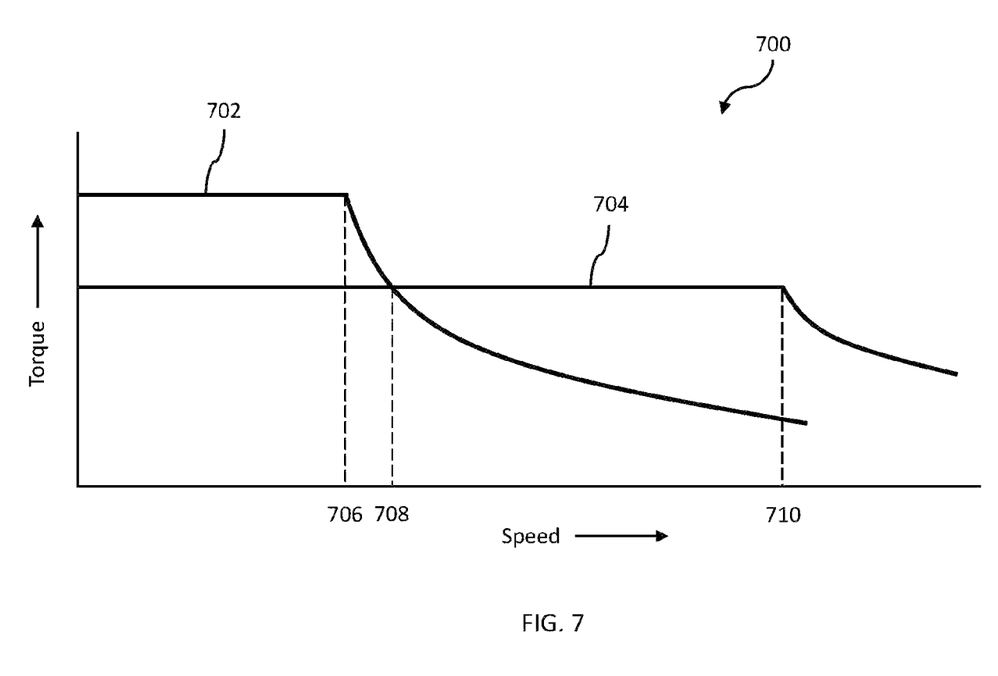
FIG. 7 is a graph illustrating an application of the multi-phase system of FIG. 1.

FIG. 7 illustrates an application for using system 100 of FIG. 1. In particular, a graph 700 shows the torque/speed relationships for a vehicle (e.g., electric or hybrid vehicle) equipped with an AC electric motor (e.g., 102). Pole switching operations can be performed in the AC electric motor to implement electronic gear shifting. That is, pole switching allows the AC electric motor to generate different torques at different speeds so as emulate gear shifting without the need or use of mechanical gears.

For example, a curve 702 represents the torque/speed relationship of the vehicle when the AC electric motor is configured in a three-phase configuration, while a curve 704 represents the torque/speed relationship of the vehicle when the AC electric motor is configured in a six-phase configuration. Before a speed point 706 (e.g., 35 MPH), the AC electric motor is operating in the three-phase configuration where a high constant torque is maintained for speeds up to speed point 706. This is akin to operating the vehicle in a first gear. At speed point 706, the driver may wish to further increase the speed of the vehicle to a speed point 708 (e.g., 45 MPH). However, in order to maintain a constant torque at those speeds above speed point 706, the AC electric motor needs to operate in the six-phase configuration where a lower constant torque is achieved to obtain higher speeds. This is akin to operating the vehicle in a second gear. Accordingly, a pole switching operation is performed to change the AC electric motor from the three-phase configuration to the six-phase configuration (e.g., shift from being in first gear to being in second gear). In the six-phase configuration, constant torque can be maintained for speeds up to a speed point 710 (e.g., 70 MPH). In some examples, the maximum speed achievable in the six-phase configuration is double that of the three-phase configuration. In certain examples, different maximum speeds can be achieved based on different configurations of the AC electric motor. In other examples, a different number of gears can be selected based on different configurations of the AC electric motor. It should be appreciated that system 100 and/or method 600 can be used in other applications such as the aerospace industry.

This application is intended to cover any variations, uses, or adaptations of the present disclosure using its general principles. Further, this application is intended to cover such departures from the present disclosure as come within known or customary practice in the art to which the present disclosure pertains and which fall within the limits of the appended claims.

Furthermore, the connecting lines shown in the various figures contained herein are intended to represent functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
    operating, by a controller, a multi-phase machine in a first configuration as a single three-phase machine with a first number of poles, the first number of poles being based on a first number of phases in the first configuration and a number of stator slots allocated for each winding in the multi-phase machine;

receiving, by the controller, a signal indicating a pole switching operation in the multi-phase machine; and in response to receiving the signal, operating, by the controller, the multi-phase machine in a second configuration as a single six-phase machine with a second number of poles, the second number of poles being based on a second number of phases in the second configuration and the number of stator slots allocated for each winding in the multi-phase machine.

2. The method of claim 1, further comprising:

determining a number of windings per phase in the first configuration based on a total number of windings in the multi-phase machine and the first number of phases in the first configuration; and determining the first number of poles based on the number of windings per phase in the first configuration and the number of stator slots allocated for each winding in the multi-phase machine.

3. The method of claim 2, further comprising:

determining a number of windings per phase in the second configuration based on the total number of windings in the multi-phase machine and the second number of phases in the second configuration; and determining the second number of poles based on the number of windings per phase in the second configuration and the number of stator slots allocated for each winding in the multi-phase machine.

4. The method of claim 1, wherein each phase of the first number of phases in the first configuration is separated by a first phase angle, and each phase of the second number of phases in the second configuration is separated by a second phase angle, the first phase angle being different from the second phase angle.

5. The method of claim 1, wherein the multi-phase machine is disposed in a vehicle and the signal indicating the pole switching operation is associated with a command to change a current torque and speed of the vehicle to a desired torque and speed.

6. A controller, comprising:

a processor; and a memory including instructions that, when executed by the processor, cause the controller to:

operate a multi-phase machine in a first configuration with a first number of poles, the first number of poles being based on a first number of phases in the first configuration and a number of stator slots allocated for each winding in the multi-phase machine;

receive a signal indicating a pole switching operation in the multi-phase machine; and in response to receiving the signal, operate the multi-phase machine in a second configuration with a second number of poles, the second number of poles being based on a second number of phases in the second configuration and the number of stator slots allocated for each winding in the multi-phase machine, wherein each phase of the first number of phases in the first configuration is separated by a first phase angle, and each phase of the second number of phases in the second configuration is separated by a second phase angle, the first phase angle being different from the second phase angle.

7. The controller of claim 6, wherein the instructions, when executed by the processor, further cause the controller to:

determine a number of windings per phase in the first configuration based on a total number of windings in the multi-phase machine and the first number of phases in the first configuration; and determine the first number of poles based on the number of windings per phase in the first configuration and the number of stator slots allocated for each winding in the multi-phase machine.

8. The controller of claim 7, wherein the instructions, when executed by the processor, further cause the controller to:

determine a number of windings per phase in the second configuration based on the total number of windings in the multi-phase machine and the second number of phases in the second configuration; and determine the second number of poles based on the number of windings per phase in the second configuration and the number of stator slots allocated for each winding in the multi-phase machine.

9. The controller of claim 6, wherein the multi-phase machine is disposed in a vehicle and the signal indicating the pole switching operation is associated with a command to change a current torque and speed of the vehicle to a desired torque and speed.

10. The controller of claim 6, wherein the first configuration is a three-phase machine configuration, and the second configuration is a six-phase machine configuration.

11. A system, comprising:

a multi-phase machine;

an inverter having a plurality of inverter legs; and a controller coupled to the inverter and the multi-phase machine, the controller configured to:

operate the multi-phase machine in a first configuration with a first number of poles, the first number of poles being based on a first number of phases in the first configuration and a number of stator slots allocated for each winding in the multi-phase machine;

receive a signal indicating a pole switching operation in the multi-phase machine; and in response to receiving the signal, operate the multi-phase machine in a second configuration with a second number of poles, the second number of poles being based on a second number of phases in the second configuration and the number of stator slots allocated for each winding in the multi-phase machine, wherein the first configuration is a three-phase machine configuration, and the second configuration is a six-phase machine configuration, and wherein the first number of poles in the three-phase machine configuration is equal to twelve and the second number of poles in the six-phase machine configuration is equal to six.

12. The system of claim 11, wherein the controller is configured to:

determine a number of windings per phase in the first configuration based on a total number of windings in the multi-phase machine and the first number of phases in the first configuration; and determine the first number of poles based on the number of windings per phase in the first configuration and the number of stator slots allocated for each winding in the multi-phase machine.

13. The system of claim 12, wherein the controller is further configured to:

determine a number of windings per phase in the second configuration based on the total number of windings in the multi-phase machine and the second number of phases in the second configuration; and determine the second number of poles based on the number of windings per phase in the second configuration and the number of stator slots allocated for each winding in the multi-phase machine.

14. The system of claim 11, wherein each phase of the first number of phases in the first configuration is separated by a first phase angle, and each phase of the second number of phases in the second configuration is separated by a second phase angle, the first phase angle being different from the second phase angle.

15. The system of claim 11, wherein the multi-phase machine is disposed in a vehicle and the signal indicating the pole switching operation is associated with a command to change a current torque and speed of the vehicle to a desired torque and speed.

16. The system of claim 15, wherein the pole switching operation represents an electronic gear shifting operation in the vehicle.

* * * * *